No. 894,549. PATENTED JULY 28, 1908.
R. B. TUFTS.
MOLD.
APPLICATION FILED MAY 17, 1907.

3 SHEETS—SHEET 1.

Witness
H. Malley
G. F. Downing

Inventor
R. B. Tufts
By H. A. Seymour
Attorney

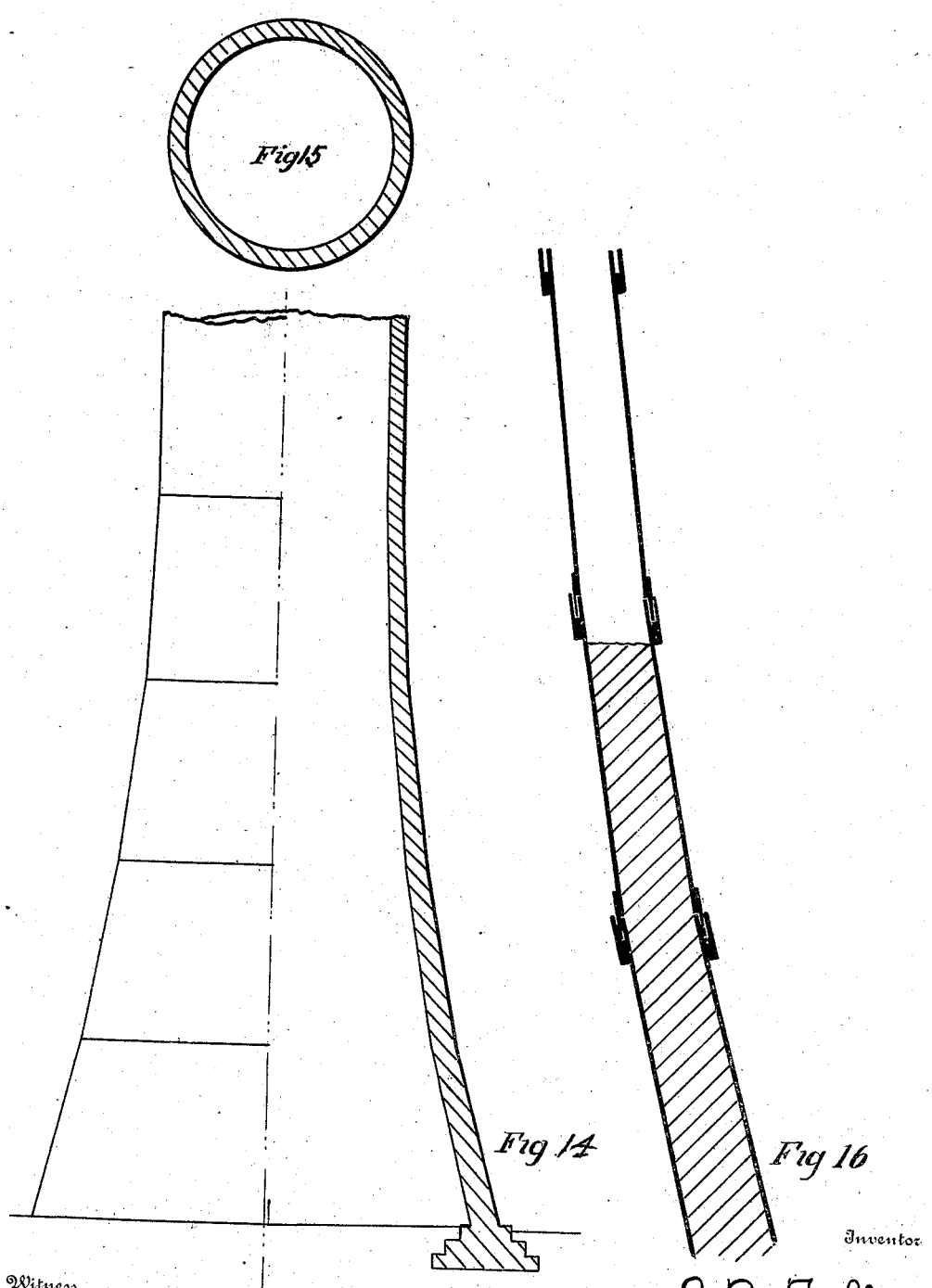

UNITED STATES PATENT OFFICE.

ROBERT B. TUFTS, OF ATLANTA, GEORGIA.

MOLD.

No. 894,549.   Specification of Letters Patent.   Patented July 28, 1908.

Application filed May 17, 1907. Serial No. 374,291.

*To all whom it may concern:*

Be it known that I, ROBERT B. TUFTS, of Atlanta, in the county of Fulton and State of Georgia, have invented certain new and useful Improvements in Molds; and I do hereby declare the following to be a full, clear, and exact description of the invention, such as will enable others skilled in the art to which it appertains to make and use the same.

My invention relates to an improvement in molds and more particularly to such as are employed in forming concrete into shaft like structures, such as light-houses, chimneys, water-towers, and other structures which are designed to be figures of revolution, the axis of revolution being vertical.

It is sometimes desirable to mold structures with cylindrical surfaces, such as concrete tanks or standpipes, having a uniform diameter from end to end, and in other cases it is desirable, either for architectural or for engineering reasons, that the structure shall be larger in diameter at the base and have a gradually diminishing diameter in a direction toward the top, so that the base portion of the structure shall have the appearance of the frustum of a cone. In other cases, it is desirable for the base portion of the structure to have a bell-shape form, the law of change in diameter being such that vertical sections will show curved lines. This latter form is especially desirable in light-house, chimney and water tower construction.

The object of my present invention is to provide a mold by means of which all of the conditions above set forth can be met.

A further object is to so construct the mold that it can be made adaptable for forming either a cylindrical or a tapering structure.

A further object is to construct the mold in such manner that it can be employed, interchangeably, to form tapering and cylindrical portions of a structure.

With these objects in view the invention consists in certain novel features of construction and combinations and arrangements of parts as hereinafter set forth and defined by the claims.

Figure 1:
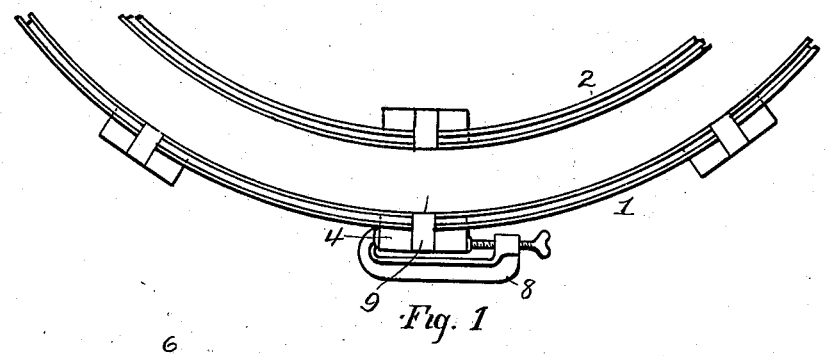
Figures 2, 3:
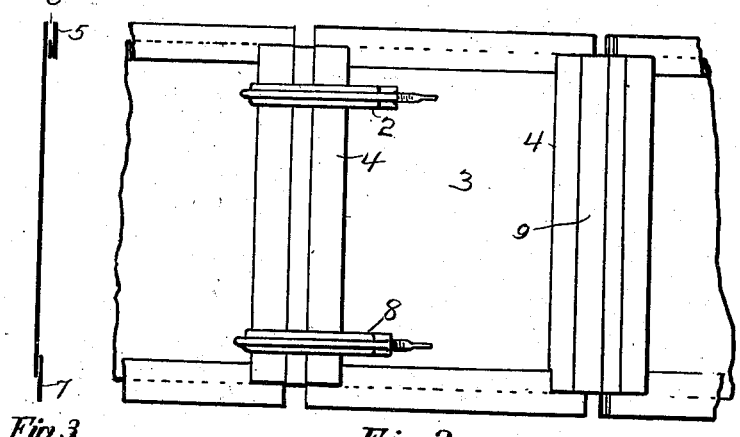
Figures 4, 5:
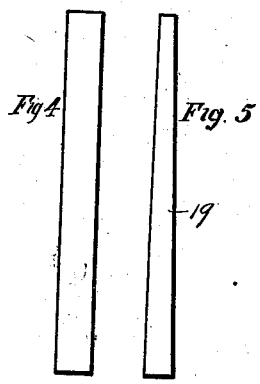
Figure 6:
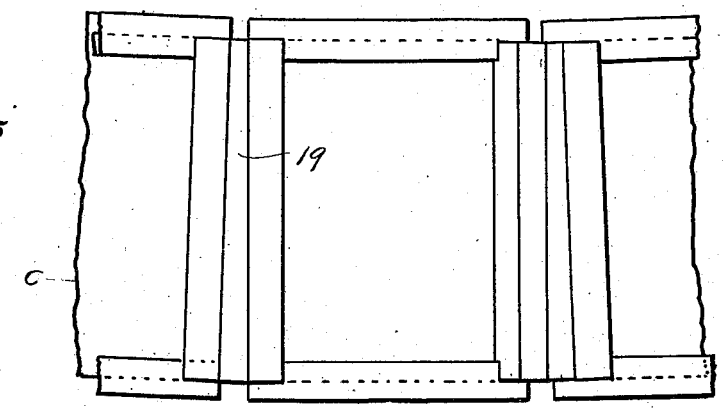
Figure 12:
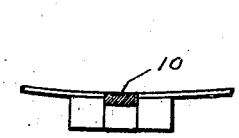
Figure 13:

In the accompanying drawings, Figure 1 is a fragmentary view of a mold embodying my improvements. Fig. 2 is a face view of same. Fig. 3 is a transverse sectional view of one member of the mold. Figs. 4 and 5 are views of one of the tapering spacers. Fig. 6 is a face view of a portion of the mold showing the application of the tapering spacers. Figs. 7, 8, 9, 10 and 11, are views illustrating views of modifications. Figs. 12 and 13 are fragmentary edge views illustrating the application of the spacers. Fig. 14 is a view, partly in elevation and partly in vertical section, of a structure having a bell-shaped base. Fig. 15 is a cross-section of the same, and Fig. 16 is an enlarged vertical section of the wall of the structure shown in Fig. 14, showing the same in course of construction with the use of my improvements.

My improved mold comprises two members 1, 2, which coöperate to form an annular space in which the wall of the structure is molded. These two members are the same in construction and therefore a specific description of one will suffice for the other.

Each member of the mold comprises a series of sheet metal sections 3, each of which is rolled so as to form a segment of a cylinder and so that when the several segments are assembled edge to edge they will form a true cylinder. Each section 3 is provided at each of its vertical edges with blocks or battens 4, which may be of wood or other suitable material and secured to the sheet metal sections in any desired manner. The upper edge of each section has secured thereto and spaced a short distance therefrom, a narrow strip 5 so as to form a groove 6, and to the lower edge of each section a narrow strip 7 is secured and depends slightly below said lower edge so that when one mold is placed upon another the tongue 7, depending from the lower edge of the upper mold, will enter the groove 6 of the under mold and cause the mold sections to aline with each other, as clearly shown in Fig. 16. It is evident that the sheet may have the groove at the top and the tongue at the bottom, or vice versa.

The several mold sections may be secured together to form a cylinder by means of clamps, such as shown at 8 Figs. 1 and 2, which are made to engage the blocks or battens 4 of abutting mold sections. Or, without affecting the principles involved, other means, one of which is the use of bolts, may be employed to hold the mold sections and spacers together. When it is desired to increase the diameter of the mold, this may be accomplished by inserting between the several mold sections, spacers 9 having side faces which are parallel with each other and with the adjacent edges of the mold sections. These spacers 9 may be made of a width sufficient to extend from the outer faces of the battens 4 to a point in alinement with the inner faces of the mold sections and form a portion of the inner face of the mold. Or, if desired the spacers may be made narrower or thinner, as shown in Fig. 12 and the space thus left may be filled with suitable plastic material 10, as shown in said figure. Instead of making the battens of wood, angle-bars 11 m. be employed, as shown in Fig. 13.

Figure 7:
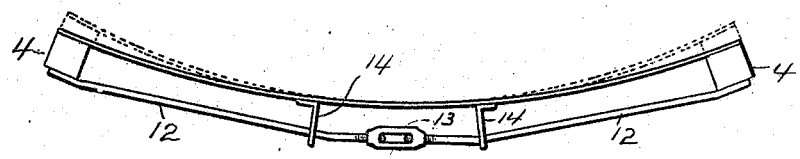
Figure 8:
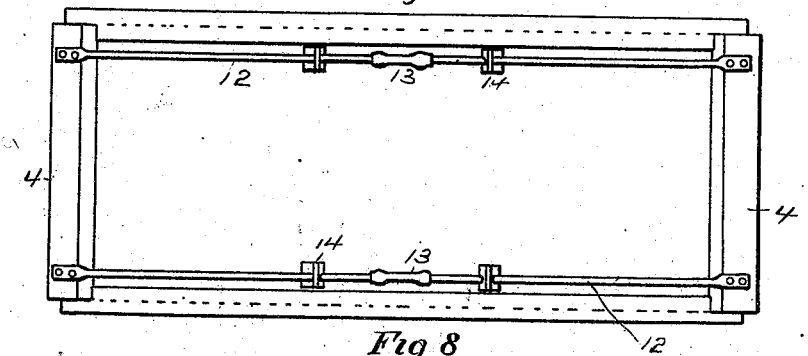

The several sections of the mold being made of flexible sheet metal, as above explained, the curvature of the mold sections may be increased or diminished by means of the devices shown in Figs. 7 and 8. In this construction rods 12 are secured at their outer ends to the battens 4 at respective ends of a mold-section and are screw threaded at their inner ends for the reception of a turn buckle 13, suitable guides 14 for these rods being provided at intermediate points on the mold section. It will be seen that by means of this construction, a flexible mold section can be readily and uniformly bent from the position shown in full lines in Fig. 7 to the position shown in dotted lines in said figure or vice versa and thus by similarly adjusting the several sections the mold can be adapted for forming structures of different diameters.

Figure 10:
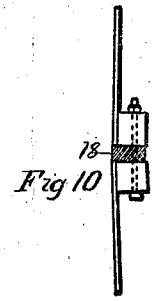
Figure 9:
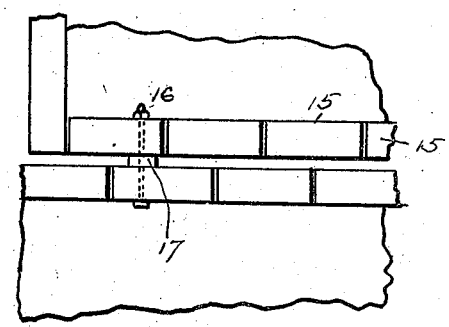
Figure 11:

Instead of uniting superimposed molds, as before explained, they may be united as shown in Figs. 9, 10 and 11. In this construction the upper and lower edges of the mold sections are provided with flanges formed by series of blocks 15 or short sections of angle-iron and through these blocks or angle iron sections bolts 16 may be passed and the blocks of one mold separated from those of the other by means of spacers 17. The space thus formed between the blocks or flanges of superimposed molds may be filled in by means of plastic material, as shown at 18, Fig. 10.

In order that the same mold by means of which the cylindrical portion of a body is formed, can be also employed in the molding of a tapering portion, such as the base part of the structure shown in Fig. 14, I employ a series of tapering spacers 19 which are placed between the battens of the several mold sections. Thus it will be seen that when tapering spacers have been placed between the battens of all the mold sections, a tapering mold will be formed. Instead of inserting only a tapering spacer between the battens of the two mold sections, as shown at the left of Fig. 6, said tapering spacers may be employed in conjunction with the spacers 9, as shown at the right of Fig. 6. These sheet metal sections, instead of being truly rectangular, may be trapezoidal in shape, the parallel sides being the upper and lower edges, in which case they are the right shape to form a conical mold, and by interposing the parallel spacers the frustum of the cone formed by a ring of these sections, may be increased, without changing the pitch or taper of the conical surface. Then by inserting taper spacers with the wider end down, the taper of the conical surface can be increased, while if the wide end of the taper spacers be placed up, the taper of the spacers tends to counteract the taper of the sheets, resulting in a frustum of a cone of less pitch or taper than with parallel spacers. If the taper of these spacers is the same as the taper of the curved sheets, the taper of one counteracts that of the other, and the resulting surface is a true cylinder.

It is evident that the mold may be made of any desired size, according to the number and size of the spacers 9 employed, and that the degree of taper which the mold may be given will depend upon the degree of angularity of the inclined faces of the tapering spacers.

The plan of operation is to fill the molds to a short distance below the top of the course with concrete, then remove a course, sheet by sheet, from the lower completed portion of the work where the concrete is sufficiently hard, placing these sheets in their proper positions on top of the top course, inserting the proper previously designed taper spacers, clamp them in position and proceed with the concrete as before.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. A mold member comprising a series of flexible sheets and tapering spacers between the mold sections and means for retaining said spacers in position with their respective faces parallel with the edges of the adjacent mold sections.

2. A mold member comprising a series of flexible sheets having inclined adjacent edges, spacers tapering longitudinally and disposed between the adjacent edges of the flexible sheets, and means for retaining the faces of the spacers and the edges of the mold sheets parallel with each other.

3. A mold member comprising a series of flexible sheets trapezoidal in shape, spacers tapering longitudinally and disposed between the adjacent inclined edges of the trapezoidal flexible sheets, and means of retaining the faces of the spacers and the edges of the mold sheets parallel with each other.

4. A mold member comprising a series of flexible sections, battens secured to respective ends of each section, removable spacers tapering longitudinally and disposed between the several sections and engaged by said battens, and means engaging the battens of adjacent sections for securing said sections in place.

5. A mold member comprising a series of sections, battens at respective ends of each section, removable spacers between adjacent battens, and plastic filler between adjacent edges of the mold sections.

6. A mold member comprising a series of flexible sheets rectangular in shape, spacers tapering longitudinally and disposed between edges of adjacent sheets and means for retaining the faces of the spacers and the edges of the mold sheets parallel with each other.

In testimony whereof, I have signed this specification in the presence of two subscribing witnesses.

ROBERT B. TUFTS.

Witnesses:
    ARTHUR TUFTS,
    B. W. BLACKSTOCK.